(12) United States Patent
Billiet

(10) Patent No.: US 6,391,197 B1
(45) Date of Patent: May 21, 2002

(54) FILTER ASSEMBLY

(75) Inventor: Colin Billiet, Gateshead (GB)

(73) Assignee: Domnick Hunter Limited, Birtley (GB)

(*) Notice: Subject to any disclaimer, the term of this patent is extended or adjusted under 35 U.S.C. 154(b) by 0 days.

(21) Appl. No.: 09/581,328

(22) PCT Filed: Dec. 14, 1998

(86) PCT No.: PCT/GB98/03676

§ 371 Date: Aug. 28, 2000

§ 102(e) Date: Aug. 28, 2000

(87) PCT Pub. No.: WO99/30802

PCT Pub. Date: Jun. 24, 1999

(30) Foreign Application Priority Data

Dec. 15, 1997 (GB) ............................................. 9726419
Jul. 23, 1998 (GB) ............................................. 9815957

(51) Int. Cl.[7] ............................................. B01D 45/02
(52) U.S. Cl. ..................... 210/232; 210/455; 210/95; 55/426; 55/395; 55/398
(58) Field of Search ............................ 210/94, 95, 299, 210/DIG. 5, 455, 232, 446; 96/416; 55/DIG. 17, 426, 429, 395, 398, 394

(56) References Cited

U.S. PATENT DOCUMENTS

| | | | |
|---|---|---|---|
| 3,257,783 A | * | 6/1966 | Baker et al. |
| 3,269,097 A | * | 8/1966 | German |
| 3,312,351 A | * | 4/1967 | Kasten |
| 3,675,776 A | | 7/1972 | Campo |
| 4,063,913 A | | 12/1977 | Kippel et al. |
| 4,149,974 A | | 4/1979 | Bolton et al. |
| 4,516,994 A | | 5/1985 | Kocher |
| 4,668,256 A | | 5/1987 | Billiet et al. |
| 4,707,168 A | * | 11/1987 | Mizutani |
| 4,848,989 A | | 7/1989 | Maeda |
| 5,395,509 A | | 3/1995 | Cisneros et al. |

FOREIGN PATENT DOCUMENTS

| | | |
|---|---|---|
| DE | 37 02 205 A1 | 8/1988 |
| DE | 39 09 402 A1 | 9/1990 |
| EP | 0 197 857 A2 | 10/1986 |
| EP | 0 198 454 A2 | 10/1986 |
| EP | 0 231 862 A2 | 8/1987 |
| EP | 0 278 771 A | 8/1988 |
| EP | 0 547 291 A | 6/1993 |
| EP | 0 578 491 A1 | 1/1994 |
| EP | 0 752 263 A1 | 1/1997 |
| GB | 1 557 946 | 12/1979 |
| GB | 2 126 497 A | 3/1984 |
| GB | 2 250 454 A | 6/1992 |
| GB | 2 261 830 A | 6/1993 |
| GB | 2 295 970 A | 6/1996 |
| GB | 2 307 422 A | 5/1997 |
| WO | WO 88/06228 | 8/1988 |
| WO | WO 90/02597 | 3/1990 |
| WO | WO 94/18387 | 8/1994 |
| WO | WO 96/12547 | 5/1996 |
| WO | WO-99/30798 A1 * | 6/1999 |
| WO | WO-99/30799 A1 * | 6/1999 |
| WO | WO-99/30800 A1 * | 6/1999 |
| WO | WO-99/30801 A1 * | 6/1999 |
| WO | WO-99/30803 A1 * | 6/1999 |

* cited by examiner

*Primary Examiner*—Joseph Drodge
*Assistant Examiner*—Terry K. Cecil
(74) *Attorney, Agent, or Firm*—Workman, Nydegger & Seeley

(57) ABSTRACT

A filter assembly for collecting material that is entrained in a gas stream includes a housing for a tubular filter element. The housing has an inlet and an outlet for the gas that is to be filtered, and includes a body section and a separable end cap. The body section has at least one longitudinally extending formation in its internal wall and its cross section is substantially constant along its length. The body section has a generally transverse groove formed in its internal wall which can be engaged by the end cap to connect it to the body section, the transverse groove having a discontinuity at a longitudinally extending edge of the longitudinally extending formation.

24 Claims, 3 Drawing Sheets

FILTER ASSEMBLY

BACKGROUND OF THE INVENTION

1. Field of the Invention

This invention relates to a filter assembly for collecting material that is entrained in a gas stream such as particulate solid material or liquid in an aerosol form, and to a tubular filter element for location in a housing to collect such material.

2. Present State of the Art

Filtration of gas in a compressed gas system is generally required so that the gas is sufficiently clean for a subsequent application or to minimize adverse effects of impurities on components of the system. For example removal of compressor oil can be required to minimize chemical contamination and accumulation on valves which might lead to malfunction of the valves and removal of particulate solid material can be required to minimize abrasion.

A known filter assembly for use in compressed gas systems is sold by Domnick Hunter Limited under the trade mark OIL-X. It comprises a housing having inlet and outlet ports for the gas stream that is to be filtered and a tubular filter element which can be located in the housing and is configured for the gas stream to flow through its wall, for example generally outwardly from the inside of the filter element to the outside. When the assembly is used to collect liquid in the gas stream (for example which is carried in the stream as an aerosol), the filter element will cause the liquid to coalesce. Coalesced liquid then drains from the filter element and collects in the housing for discharge. For such applications, the housing will include an outlet for discharge of any collected liquid.

The housing of such a filter assembly comprises a body section in which the filter element is located and a head end cap with the inlet and outlet ports for the gas stream. The end cap includes appropriate conduits within it for the gas stream to flow between the ports and the filter element. The body section is closed at its base and therefore provides a reservoir in Which coalesced liquid that has been filtered from the gas stream can collect. The formation of the body section housing with a closed base means that each body section must be made individually, for example by a moulding or casting process. Different tools for use in such processes are required for each configuration of product.

SUMMARY OF THE INVENTION

The present invention provides a filter assembly in which the housing comprises a body section with a constant cross-section along its length and at least one separable end cap.

Accordingly, in one aspect, the invention provides a filter assembly for collecting material that is entrained in a gas stream, which comprises a housing for a tubular filter element the housing having an inlet and an outlet for the gas that is to be filtered, and comprising a body section and a separable end cap, the body section having at least one longitudinally extending formation in its internal wall and its cross-section being substantially constant along its length, the body section having a generally transverse groove formed in its internal wall which can be engaged by the end cap to connect it to the body section, the transverse groove having a discontinuity at a longitudinally extending edge of the longitudinally extending formation.

The constant cross-section of the body section is such that its cross-section at any two spaced apart points taken on parallel planes are similar and equal figures, apart from features by which te cross-section is specifically modified for example to provide fixation points for other components of the assembly or to provide seals to other components. The constant cross-section is such as might be formed by an extrusion process. It is an advantage of the present invention that the body section of the housing can be formed by extrusion, allowing the body section effectively to be formed continuously.

The filter assembly of the present invention has the advantage that the holding can be constructed with a size suitable for the filter element that is to be used in it and for the location in which te assembly is to be used, by cutting the body section to an appropriate length. Common end caps can be used for housings with a range of capacities. Details of a housing which with a body section having a constant cross-section and separable end caps are disclosed in WO-A-30803 (which claims priority from UK patent applications nos. 9726419.6 and 9815963.5 and which has the same filing, priority and publication dates as the present application). Subject matter that is disclosed in that document is incorporated in the specification of the present application by this reference. The flexibility of design that arises from use of a constant cross-section body section Las advantages for he user because products can be built to meet the requirements of his application. The flexibility has advantages for the manufacturer of the housing because a range of products can be made without the need to make different moulds for each product. The inventory of parts that the manufacturer is required to maintain for manufacture of a range of products is also minimised. Maintenance is facilitated since parts of a housing that have failed can be replaced without having to replace all of the housing.

In another aspect, the invention provides a method of making a housing for a filter for collecting material that is entrained in a gas stream, which comprises forming a body section with at least one longitudinally extending formation in its internal wall by extrusion, cutting the body section to an appropriate length, and fastening the body section at each of its ends to respective end caps.

It is an advantage of the constant cross-section of the body section that it can be made conveniently by extrusion with formations present in the wall. The internal formation in the body section might stand proud of the internal surface in the manner of a rib. It might be in the form of a groove. A combination of one or more ribs and one or more grooves might be incorporated.

It has been found that an internal longitudinal formation can facilitate drainage of liquid that has coalesced in the housing into the bottom of the housing for discharge. This can be important to prevent reentrainment of the liquid in the gas stream as it is discharged from the assembly. It is a particular advantage when the gas stream passes through the wall of the filter element from the internal cavity for discharge from the annular space between the filter element and the internal wall of the housing.

The internal formation can be used to incorporate a generally transverse groove into the body section in its internal wall for engaging one or more end caps. For example, when the longitudinally extending formation comprises a rib, the generally transverse groove can be formed in the rib. When the longitudinally extending formation comprises a groove, the generally transverse groove can be formed in the wall of the body section, communicating with the longitudinal groove. When the groove is provided in the rib, it can extend around the full width of the rib or just a part of the width of the groove. When the groove is provided in the wall of the body section to communicate with the longitudinally extending groove, it can extend around substantially all of the perimeter of the body section (apart from that part occupied by the longitudinally extending groove unless it is deeper than that groove) or just a part of the perimeter of the body section, for example less than 70%, less than 50%, less than 40% or less than 20%.

Preferably, the width of the internal formation, measured as the proportion of the perimeter of the body section that it occupies, is at least about 3%, more preferably at least about 7%, for example at least about 10%. The width is preferably not more than about 20%, more preferably not more than about 15%. When the body section has a generally circular cross-section, the width of the formation can be expressed in terms of angle of arc. The formation will therefore preferably have a width of at least about 5°, more preferably at least about 10°, especially at least about 15°, for example at least about 20°. The width will preferably be less than about 50°, more preferably less than about 40°, especially less than about 30°.

Formations may be provided in the external wall of the body section. For example, the formations might be in the form of fins which are provided in an array which extends around at least a substantial part of the periphery of the body section to increase significantly the surface area of the housing body. Such fins can facilitate heat exchange with the gas that is being filtered in the assembly, generally to reduce the temperature of the gas. The assembly can include an identifier plate, and the formations can be arranged on the external surface of the body section to engage the plate to retain it in place on the body section. For example, the body section can have a pair of elongate ribs which engage the plate along a pair of opposite edges. The plate might be colour coded or might bear information material (for example by printing, embossing, etching etc) as to the manufacturer, operating conditions, safety information, service and maintenance data and so on. The convenient formation of ribs for engaging the plate allows such information to be securely and easily fixed to the body section without any need for fasteners such as rivets or screws. It also has the advantage of being visually appealing.

Preferably, the end cap has at least one port formed in it through which the gas to be filtered can pass into or out of the housing. The end cap will generally have at least two ports which can function as the inlet and outlet respectively for the gas to be filtered. Because of the provision of the inlet and outlet, this housing end cap is referred to as, the head end cap. It will generally be at the upper end of the housing when the assembly is in use. It can be preferred for the head end cap to have at least three ports which are to provide between them the inlet and outlet for the gas that is to be filtered. The provision of at least three ports can enable selection of the relative orientation of the inlet and the outlet by selection of the ports in the end cap that are to provide the inlet and the outlet respectively.

The head end cap will generally have a flow conduit within it for directing the flow of gas between the filter medium and one of the ports in the end cap. Such a conduit might be used to direct a gas stream from an inlet port to the internal cavity within a tubular filter element, to pass through the wall of the filter element for subsequent discharge through the end cap outlet port. The filter element in this arrangement is operating in an in-to-out mode. When the filter element is operating in an out-to-in mode, the flow conduit will extend between the internal cavity within the filter element and the outlet port on the end cap.

It is preferred that the assembly includes a flow conduit which can be fitted into the head end cap, with one end sealed to a port in the end cap, for directing the flow of gas between a port in the head end cap and the filter medium. The connection between the flow conduit and the head end cap might be temporary when separation of the end cap and the flow conduit is required or it might be substantially permanent. The use of a flow conduit which is fitted into the head end cap has the advantage that the flow conduit can be made with a configuration that is not restricted by having to be formed as an integral part of the end cap. For example, when the axes of the openings at the opposite ends of the conduit are not aligned, the flow path between the openings can be configured to present a continuous smooth flow path to the gas stream flowing along it between the first and second conduit openings. The smooth flow path can be constructed to reduce restriction of the flow of the stream compared for example with a flow conduit which presents a discontinuous flow path which is sharply angled or contains steps or other obstructions.

The flow conduit can be made with additional features during its manufacture. For example, a port might be formed in it for connection to means for indicating the pressure within the conduit. A tang might be formed on the flow conduit which can be received in a recess in the housing when the flow conduit is properly located within the housing end cap. This can provide a indication tat the flow conduit is properly located, for example by visual inspection or as a result of the tang being resiliently deformable and being received in the recess with a snap fit. The flow conduit can be located in its appropriate position within the end cap by means of interengaging fibs an the flow conduit and the end cap respectively. A filter assembly in which a flow conduit device is assembled by sliding engagement with a housing is disclosed in WO-A-99130798 (which lams priority from UK patent applications nos. 9726415.4 and 9815961.9 and which the same priority and publication dates as the present application). A filter assembly which comprises a housing having a body section and an and cap, with a flow conduit received in the end cap, is disclosed in WO-A-99/30799 (which claims priority from UK patent applications nos 9726415.4 and 9815959.3 and which has the same filing priority and publication dates as the present application). Subject matter disclosed in each of these documents is incorporated in the specification of the present application by these references.

When the flow conduit is separable from the end cap, it is preferred that at least one of the ports has formations for engaging the flow conduit, in particular to retain it in sealing engagement with the port. For example, the flow conduit can be located in its appropriate position within the end cap by means of interengaging ribs on the flow conduit and the end cap respectively. For example, the flow conduit can have a flange on it whose opposite edges present a pair of ribs which are received between a corresponding pair of ribs on the end cap to retain the flow conduit in sealing contact with a mating surface within the end cap. The ribs can be aligned with the axis along which the flow conduit is introduced into the end cap so that the two sets of as engage one another as the flow conduit is introduced. Preferably, the ribs are configured so that the mating sealing surfaces on the flow conduit and the end cap are forced together as the flow conduit is introduced into the end cap, to enhance the seal between the surfaces. This can be achieved for example by provision of an appropriate taper or wedge shape on the ribs on the flow conduit or the end cap.

Generally, the flow of the gas stream towards and away from the assembly will be generally horizontal. The tubular filter element will generally be arranged vertically so that the end cap is arranged at the top of the housing with the body section depending below it.

Preferably, the housing comprises first and second end caps for fitting to respective opposite ends of the body section.

The body section and the or each end cap should be capable of being connected to one another with sufficient security to withstand internal pressures to which the assembly is subjected when in use. Examples of appropriate connections include threaded and bayonet-type connections, The body section will generally require localised modification to enable these connections to be made. For example, fastenings might be affixed to the body section. Formations might be created in the body section by machining, for example involving the formation of threads, threaded bores, generally transversely extending grooves, upstanding hook-type features to engage a groove or other recess, and so on. When a connection is to be made by means of a bayonet-type fitting, a groove can be provided in the body section to engage a lug on the end cap. The groove can be formed in an internal rib in the body section as discussed above. The groove might include a detent to provide a restriction against relative rotation of the end cap and the body section as can be characteristic of bayonet-type fittings.

When the internal longitudinal formation is used to form a groove for a connection between the body section and another component of the assembly, it will be preferred generally for there to be at least two such formations, for example two or three formations, spaced apart around the body section.

Features might be included on the body section to form an effective gas-tight seal (to the extent that is required for a particular application having regard to for example the pressure to which the assembly is exposed in use) between the body section and the end caps. For example a groove or a rib might be provided in one or both of the end faces of the body section to engage tie end caps, possibly with an intermediate gasket.

It will be understood that a body section which incorporates additional features such as those described above for seal or formation of a connection is not to be regarded as not having a constant cross-section when, apart from those features, the cross-section is constant.

Preferably, the assembly includes means for indicating when the or each end cap and the body section are connected to one another sufficiently securely to withstand the intend pressures. This can have the advantage of also indicating that a flow conduit that is separable from the head and cap is appropriately located in the end cap, for example when the flow conduit engages the body section (directly or indirectly) and it is through the action of the body section on the flow conduit that the flow conduit is forced into the end cap, The indication can be visual, for example involving the appearance of a marking in a window in the housing or the flow conduit The indication can be sensed in other ways, for example by feeling engagement of a resilient member in a recess. For example, one of the flow conduit and the housing can bear a resiliently deformable tang and file other of the flow conduit and the housing can have a recess formed in it in which the tang is received when the flow conduit is properly located within the end cap Details of the location of a deformable tang in a recess to retain connected components of a filter assembly together or to indicate proper connection of the components arc disclosed in WO-A-99/30801 (which claims priority from UK patent applications nos, 9726418.8 and 9815955.1 and which has the same filing, priority and publication dates as the present application), Subject mater disclosed in that document is incorporated in the specification of the present application by this reference.

When the filter assembly is intended for use in applications in which liquid impurities are to be collected, the housing preferably has an outlet for liquid entrained in the gas stream which coalesces in the filter element. The outlet will generally be at the end of the housing that is remote from the head end cap, particularly preferably in an end cap which will provide the base of the housing. The base end cap will generally be located at the lower end of the housing when the assembly is in use. The base end cap can therefore define a reservoir into which coalesced liquid can drain from the filter element and have formations for engaging a valve for controlling the discharge of collected liquid from the housing. The reservoir can be made from a material that is transparent. The provision of a reservoir in a separable end cap has the advantage of enabling ready access to the interior of the housing at its lower end, for example for inspection, cleaning or replacement of the reservoir or any valve located within it. When the second end cap defines a reservoir, it can be preferred for it to include a protective cage positioned around the reservoir.

It will often be preferred for one, especially both, of the body section and the head end cap of the housing to be formed from a metallic material such as a steel or an aluminium alloy, in particular to enable the housing to withstand the internal pressures to which it is exposed when in use, The end cap will then often b e made from a casting process. Polymeric materials c an be appropriate for many applications, for example when the filter assembly is only to be exposed to moderate pressures in use or has a small size. A reservoir in the base end cap can be made from a material that is transparent.

It will often be preferred for a flow conduit that is separable from the housing to be made from a polymeric material such as a polyolefin, a polyamide, or a polyester. The polymeric material can be reinforced for example by fibres. The use of a polymeric material for the flow conduit has the advantage that it can conveniently be formed by a moulding process.

The filter element comprises a tubular body of filter medium and top and bottom end fittings by which the filter medium is supported within the housing. A flow conduit that is separable from the housing head end cap can be provided as part of one of the end fittings of the filter element, especially when the end fitting (including the flow conduit) is formed by a moulding operation. A support for the filter element can be provided as part of one of the end rings of the filter element, especially when the end fitting (including the support) is formed by a moulding operation.

The filter medium will be selected according to the requirements on the assembly when in use, for example in terms of the nature and quantity of the impute (for example as to whether it comprises liquid impurity or solid impurity or both) in the g,as stream the degree of filtration required of the medium, the pressure to which the assembly is exposed when in use. When the impurity to be collected includes liquid (which will generally be present as an aerosol for example of compressor oil), the filter medium will preferably be capable of causing liquid droplets to coalesce. Materials suitable for use in a coalescing filter element are known, including those sold by Domnick Hunter Limited under the trade mark OIL-X. Suitable materials include borosilicate and other glass fibres, activated cabon materials activated silica materials and so on.

When the filter assembly is intended for use in applications in which liquid impurities are to be collected, the housing preferably includes an outlet at its second end for liquid entrained in the gas stream which coalesces in the filter element.

Preferably, the assembly includes a support which extend between the filter element and the internal side wall of the housing to restrict the filter element against movement within the housing in a direction along the axis of the filter element. Preferably, the support extends from the end fitting of the filter element at its end remote from the head end cap in a direction towards the side wall of a housing generally transversely relative to the longitudinal axis of the filter element. For example the angle between the support and the said axis can be at least about 45°, preferably at least about 60°, more preferably at least about 75°, and possibly 90° or more for some applications when the support will be approximately perpendicular to te axis. When the angle between the .support and the axis is less than 90°, it will generally be preferred for te support to be inclined in a direction away from the housing head end cap. This has the advantage of enhancing he ability of the support to withstand force exerted by pressurised gas supplied to the housing end cap. A suitable support for the filter element can comprise at least three limbs which are arranged to extend between the filter medium and the side wall of a housing in which the filter element is to be used. As a result, the filter element is supported stably within the housing, both along and transverse to its axis. Details of a support on one of the end fittings of a filter element are disclosed in WO-A-99/30800 (which claims priority from UK patent applications Nos. 9726416.2 and 9815954.4 and which has the same filing, priority and publication dates as the present application) Subject matter disclosed in that document is incorporated in the specification of the present application by this reference.

Preferably, the housing has an internal support surface on which the support rests when the filter element is properly located within the housing. The support surface can face axially in the housing, towards the end of the housing from which the filter element is inserted into the housing. The support surface can be provided by a shoulder or ledge on which the support can rest, Accurate positioning of the support surface can ensure that the seal between the filter element and the housing head end cap is formed reliably when the body section and the head end cap of the housing are connected to one another. Preferably, the support surface on which the support rest is provided at about the interface between the body section and the base end cap. For example the support surface might be provided in the base end cap at about the interface with the body section.

The support surface can be configured to provide positive location of the support, for example to prevent or at least to restrict rotation of the support relative to the housing. Often, e support surface will be continuous around the perimeter of the housing; for example it might be provided in the form of a ledge or shoulder which extend around the entire perimeter of the housing.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

Figure 1:
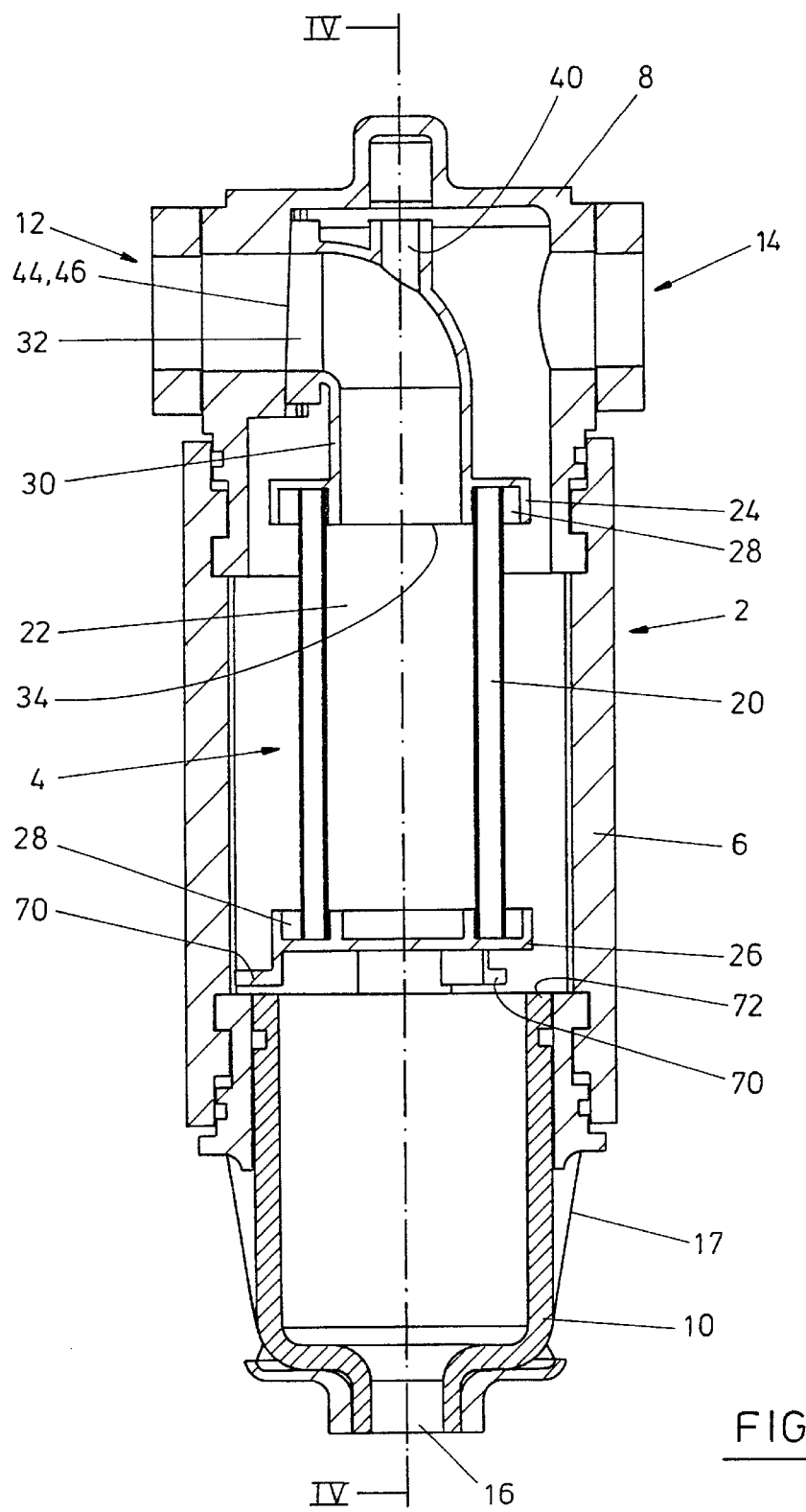
FIG. 1 in a sectional side elevation through a filter assembly according to the invention.
Figure 2:
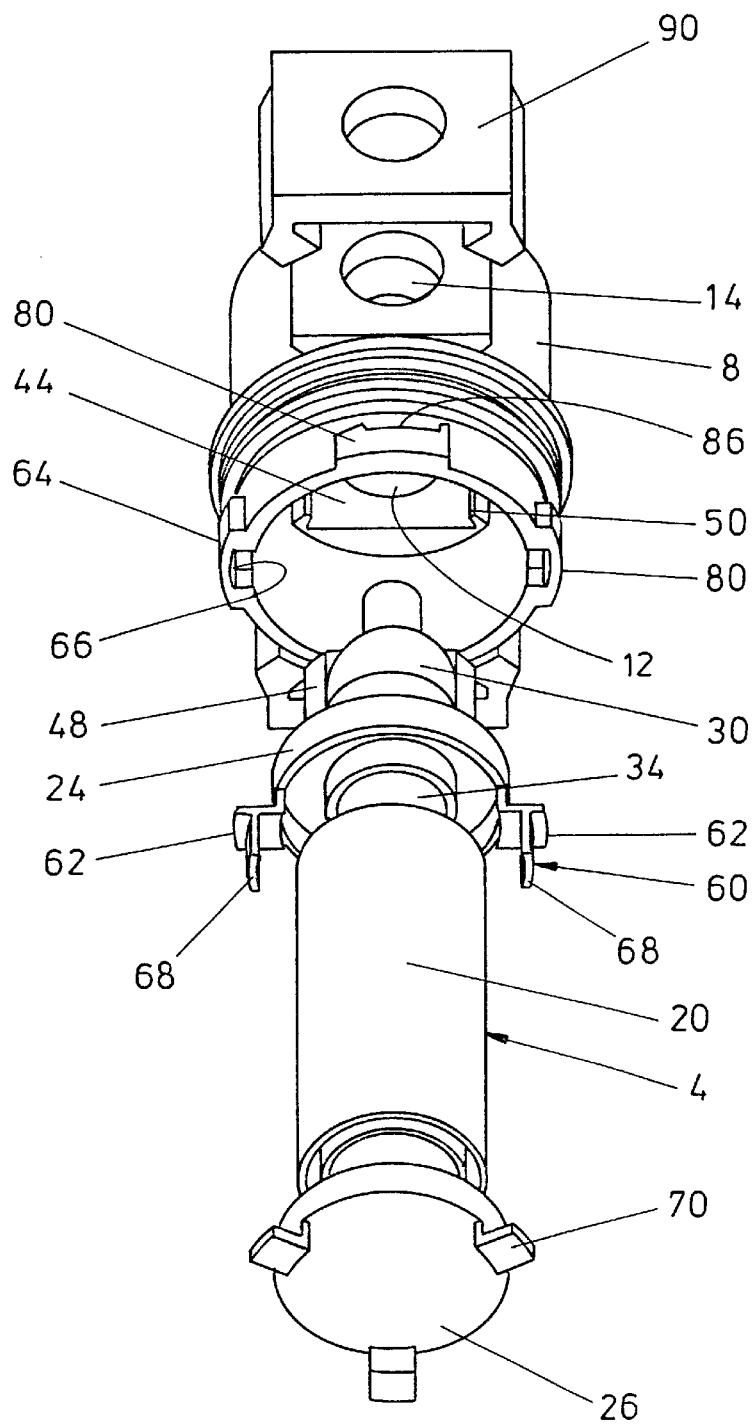
FIG. 2 is at exploded view from below of the filter element and head end cap of the housing of the assembly.

Referring to the drawings, the assembly of the invention comprises a housing 2 and a filter element 4. The housing consists of a body section 6 and head and base end caps 8, 10. The filter element is located wholly within the body section 6 of the housing with the ends of the body section extending beyond the ends of the filter element.

The head end cap 8 contains an inlet port 12 and an outlet port 14 for a gas that is to be filtered. When the assembly is to be used to collect liquid in a gas stream, the base end cap 10 can provide a reservoir, and contain an outlet 16 for liquid that has collected in the assembly. It can conveniently be made from a transparent material so that the level of liquid within it can be inspected. It can include a protective cage 17 for the reservoir.

The filter element 4 comprises a cylindrical wall section 20 formed from a filter medium and top and bottom end fittings 24, 26. The wall section defines a cavity 22 within it. The material of the filter medium will be selected according to the nature of the gas to be filtered and the material in it that is to be filtered. When the gas to be filtered contains aerosol droplets of liquid contaminant, the filter medium will be selected to cause the liquid to coalesce. The coalesced liquid within the filter medium will drain through the filter medium and from the filter element. Each of the end fittings has a trough 28 formed in it in which the wall section 20 is received and sealed so as to ensure that flow of fluid through the filter element takes place through the filter medium.

In use, a gas that is to be filtered enters the housing 2 through the inlet port 12 in the head end cap 8 and is directed to the internal cavity 22 within the filter medium by means of a flow conduit 30. It flows outwardly through the filter medium. Any liquid in the gas stream can be coalesced within the filter medium. Any solid particles within the gas stream can also be collected by the filter element.

Gas that has passed through the filter medium is discharged from the assembly through the outlet port 14 in the head end cap 8.

The description above applies to the filter assembly when operated in an in-to-out mode. As discussed above, the assembly can instead be configured for use in an out-to-in mode.

In each case, connections to the housing end cap for the flow of fluid can be made by means of an adaptor block 90 which can be fitted to the housing head end cap 8 and which bears appropriate formations to make a secure connection to a conduit for the fluid to be filtered or other component.

The head end cap 8 contains the flow conduit 30 by which the flow of gas between the inlet port 12 in the head end cap and the internal cavity 22 within filter medium 20 is directed. The flow conduit 30 has a first conduit opening 32 which is sealed to the inlet port, and a second conduit opening 34 which communicates with the internal cavity 22 within the filter medium. The flow conduit has a port 40 in it for connection to a gauge for measuring the differential pressure across the filter element. The flow conduit 30 can be formed with its curved shape and integral port and other features by a moulding process, especially when it is formed from polymeric material. The flow conduit can be formed as a one-piece moulding with the top end fitting 24 of the filter element 4.

The inlet port 12 in the head end cap and the corresponding face of the flow conduit present mating planar internal surfaces 44, 46. The opposite edges of the surface 46 on the flow conduit present a pair of ribs 48 which are received between a corresponding pair of ribs 50 presented by the surface 44 on the end cap to retain the sealing surfaces in contact with one another. The ribs 48 on the flow conduit and the ribs 50 on the end cap are aligned with the axis along which the flow conduit is introduced into the housing end cap so that the two sets of ribs engage one another as the flow conduit is introduced. The ribs are tapered appropriately to ensure that the mating sealing surfaces 44, 46 on the flow conduit and the housing head end cap are forced together as the flow conduit is introduced into the end cap, to enhance the seal between the surfaces. A sealing gasket is provided in a groove on the surface 46 of the flow conduit around the first conduit opening 32, which is compressed between that surface and the surface 44 on the end cap. The port 40 can be received in a downwardly facing socket in the end cap, forming a seal by compression of a gasket between the internal surface of the socket and the external surface of the port.

The flow conduit 30 bears a downwardly extending deformable tang 60. The tang has an outwardly projecting limb 62 which can be received in a slot 64 in the housing end cap 8 when the flow conduit is properly located in the end cap. Location of the limb 62 in the slot 64 is facilitated by a tapered ramp 66 to the slot, causing the tang to be deformed inwardly before springing back into the slot. Once located in the slot, the limb can retain the flow conduit within the end cap, at least until other components of the assembly have been introduced. The tang 60 also includes a downwardly extending projection 68 by which the tang can be deformed inwardly to release the limb 62 from the slot, allowing the flow conduit to be released from the end cap.

The bottom end fitting 26 includes three transversely extending limbs 70 which-extend between the filter medium 20 and the internal wall of the housing. The end fitting is preferably formed with its three limbs as a one-piece component, especially by moulding. The limbs engage a support surface in the form of an upwardly facing ledge 72 on the base end cap 10 of the housing. When the assembly is assembled with head and base end caps connected to the body section 6 of the housing and the flow conduit 30 within the head end cap, the support provided for the filter element by the limbs 70 acting on the base end cap retains the flow conduit within the head end cap 8, against the downward force resulting from the differential pressure across the filter medium.

Figure 3:
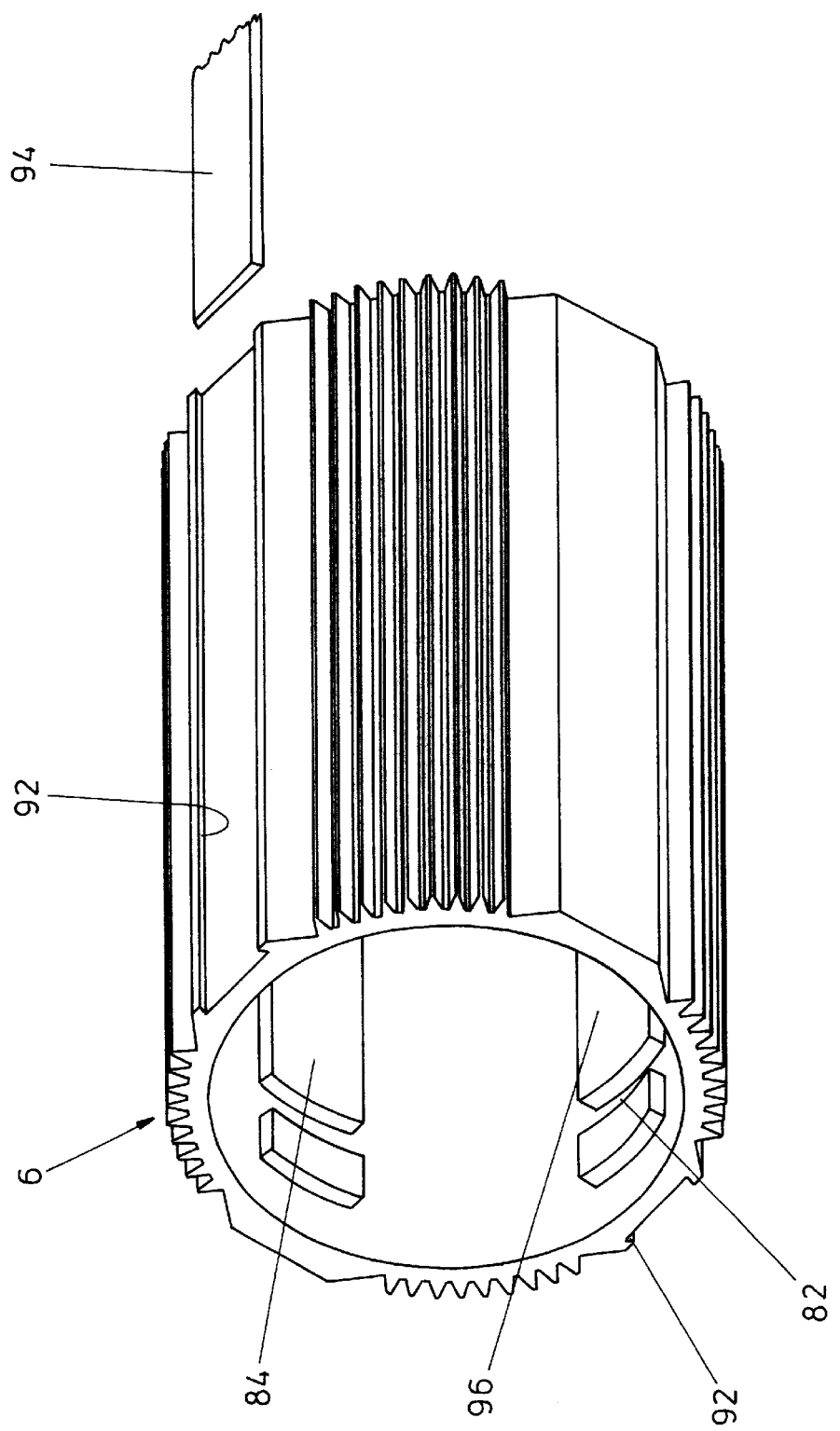
FIG. 3 is an isometric view of the body section of the assembly.

FIG. 3 shows the body section of the housing in more detail. It has a constant cross-section such as results from extrusion. It has a plurality of fins which are provided in spaced apart arrays around the periphery of the body section. The fins increase significantly the surface area of the housing body and can facilitate heat exchange with the gas that is being filtered in the assembly, for example to reduce the temperature of the gas.

The body section also has two pairs of elongate ribs 92 which can be used to locate an identifier plate 94 which can be inserted between them. The plate might be colour coded or might bear information material (for example by printing, embossing, etching etc) as to the manufacturer, operating conditions, safety information, service and maintenance data and so on.

The body section also has four longitudinally extending internal ribs 84, 96. Each rib has a groove 82 formed in it by machining after the extrusion step.

The connections between the head end cap 8 and the body section 6 of the housing can be made by a bayonet arrangement in which four orthogonally arranged lugs 80 on the end cap which are received in the transverse grooves 82 in the rib 96 in the body section. A detent 86 on at least some of the lugs 80 can retain the lugs and grooves together, preventing inadvertent rotation which would release the end cap from the body section. A similar arrangement of lugs and grooves can be used to form a connection between the base end cap and the body section.

Appropriate seals will be provided between the components of the housing to prevent unwanted loss of pressure.

What is claimed is:

1. A filter assembly for collecting material that is entrained in a gas stream, which comprises a housing for a tubular filter element, the housing having an inlet and an outlet for the gag that is to be filtered, and comprising an extruded tubular body section having an integral internal wall extending between a first end and an opposing second end, a separable first end cap positioned at the first end of the body section, and a second end cap positioned at the second end of the body section, the body section having at least one longitudinal formation in its internal wall extending longitudinal along its length, the at least one longitudinal formation having a longitudinally extending edge, the cross-section of the body section being substantially constant along its length, the body section having a generally transverse groove formed in its internal wall which can be engaged by the first end cap to connect it to the body section, the transverse groove extending from the longitudinally extending edge of the longitudinal formation and being bounded on opposing sides by portions of the internal wall extruded with the tubular body.

2. A filter assembly as claimed in claim 1, in which the longitudinal formation comprises a rib.

3. A filter assembly as claimed in claim 1, in which the longitudinal formation comprises a groove.

4. A filter assembly as claimed in claim 1, in which the longitudinal formation comprises a rib and in which the generally transverse groove is formed in the rib.

5. A filter assembly as claimed in claim 1, in which the longitudinal formation comprises a groove and in which the generally transverse groove is formed in the wall of the body section, extending from and communicating with the longitudinal groove.

6. A filter assembly as claimed in claim 1, in which the first end cap has at least one opening formed in it through which the gas to be filtered can pass into or out of the housing.

7. A filter as claimed in claim 6, in which the first end cap with the opening for gas to be filtered is located at an upper end of the housing when the assembly is arranged for use.

8. A filter assembly as claimed in claim 1, in which the housing has an outlet for liquid entrained in the gas stream which coalesces in the filter element.

9. A filter element as claimed in claim 8, wherein the liquid outlet is located in one of the end caps and the outlet for the gas stream is located in another one of the end caps.

10. A filter assembly as claimed in claim 9, in which the end cap with the outlet for liquid has formations formed in it for engaging a valve controlling the discharge of the collected liquid.

11. A filter assembly as claimed in claim 10, in which the end cap with the formations for engaging a valve is located at a lower end of the housing when the assembly is arranged for use.

12. A filter assembly as claimed in claim 1, in which the body section includes an external wall having at least one longitudinally extending formation therein.

13. A filter assembly as claimed in claim 12, in which the body section has a plurality of longitudinally extending formations in its external wall in the form of fins, which are provided in an array which extends around at least a substantial part of the periphery of the body section to increase significantly the surface area of the body section.

14. A filter assembly as claimed in claim 12, which includes an identifier plate and in which the at least one longitudinal formation of said external wall is arranged on an external surface of the body section to engage the plate to retain it in place on the body section.

15. A filter assembly a claimed in claim 1, in which the body section engages at least one of the end caps by respective bayonet-type formations on the end cap and the body section, the bayonet-type formation on the body section being provided by the combination of the transverse groove and the at least one longitudinal formation.

16. A filter assembly as claimed in claim 1, which includes a filter element located within the housing.

17. A filter assembly as claimed in claim 1, in which the body section has a formation in at least one of its ends to enhance the seal between the body section and the end cap that is in contact with that end of the body section.

18. A filter assembly as claimed in claim 1, in which one of the end caps defines a reservoir into which coalesced liquid can drain from the filter element, and has a valved outlet for discharge of collected liquid from the housing.

19. A filter assembly as claimed in claim 18, in which said one of the end caps includes a reservoir that is formed from a material which is sufficiently transparent to enable the level of liquid within it to be inspected.

20. A filter assembly as claimed in claim 18, in which said one of the said end caps includes a protective cage positioned around the reservoir.

21. A filter assembly for collecting material that is entrained in a gas stream, the filter assembly comprising:
   a housing bounding a compartment, the housing having a gas inlet and a gas outlet communicating with the compartment, the housing comprising:
      a tubular, substantially cylindrical, extruded body section having an interior surface and an exterior surface each extending between a first end and an opposing second end;
      a rib projecting inwardly from the interior surface of the body section, the rib longitudinally extending between the first end and the opposing second end of the body section and being integrally extruded therewith;
      a first groove transversely extending across at least a portion of the rib at or adjacent to the first end of the body section;
      a first end cap having an annular side wall with a lug outwardly projecting therefrom, the first end cap being configured such that when the annular side wall is removably received within the first end of the body section, the first end cap can be selectively rotated so that the lug is received within the first groove; and
      a second end cap secured to the second end of the body section; and
      a filter element disposed within the compartment of the housing.

22. A filter assembly as claimed in claim 21, further comprising:
   a second groove transversely extending across at least a portion of the rib at or adjacent to the second end of the body section; and
   the second end cap having an annular side wall with a lug outwardly projecting therefrom, the second end cap being configured such that when the annular side wall is removably received within the second end of the body section, the second end cap can be selectively rotated so that the lug is received within the second groove.

23. A filter assembly for collecting material that is entrained in a gas stream, the filter assembly comprising:
   a housing bounding a compartment, the housing having a gas inlet and a gas outlet communicating with the compartment, the housing comprising:
      a tubular, substantially cylindrical, extruded body section having an interior surface and an exterior surface each extending between a first end and an opposing second end;
      a longitudinal groove recessed on the interior surface of the body section, the longitudinal groove longitudinally extending between the first end and the opposing second end of the body section;
      a first groove transversely extending across at least a portion of the interior surface of the body section at or adjacent to the first end of the body section, the first groove intersecting with the longitudinal groove;
      a first end cap having an annular side wall with a lug outwardly projecting therefrom, the first end cap being configured such that when the annular side wall is removably received within the first end of the body section, the first end cap can be selectively rotated so that the lug is received within the first groove; and
      a second end cap secured to the second end of the body section; and
      a filter element disposed within the compartment of the housing.

24. A filter assembly as claimed in claim 23, further comprising:
   a second groove transversely extending across at least a portion of the interior surface of the body section at or adjacent to the second end of the body section, the second groove intersecting with the longitudinal groove; and
   the second end cap having an annular side wall with a lug outwardly projecting therefrom, the second end cap being configured such that when the annular side wall is removably received within the second end of the body section, the second end cap can be selectively rotated so that the lug is received within the second groove.

* * * * *

UNITED STATES PATENT AND TRADEMARK OFFICE
CERTIFICATE OF CORRECTION

PATENT NO.   : 6,391,197 B1
DATED        : May 21, 2002
INVENTOR(S)  : Colin Billiet It is certified that error appears in the above-identified patent and that said Letters Patent is hereby corrected as shown below:

Column 1,
Line 18, insert -- , -- after "valves"
Line 40, change "Which" to -- which --
Line 56, after "element" insert -- , --

Column 2,
Lines 2 and 13, change "te" to -- the --
Line 11, change "holding" to -- housing --
Line 24, change "Las" to -- has --

Column 3,
Line 48, delete "," after "as"

Column 4,
Line 16, before "stream" insert -- gas --
Line 26, change "tat" to -- that --
Line 30, change "fibs and" to -- ribs on --
Line 33, change "99130798" to -- 99/30798 --
Line 33, change "lams" to -- claims --
Line 35, after "which" insert -- has --
Line 35, after "same" insert -- filing, --
Line 39, change "nos" to -- nos. --
Line 58, before "engage" change "as" to -- ribs --

Column 5,
Line 39, change "tie" to -- the --
Line 43, change "seal" to --sealing --
Line 48, change "intend" to -- internal --
Line 50, change "and" to -- end --
Line 55, change "cap," to -- cap. --
Line 57, after "conduit" insert -- . --
Line 60, change "file" to -- the --
Line 63, after "cap" insert -- . --

Column 6,
Line 1, change "nos," to -- nos. --
Line 31, after "b e" to -- be --
Line 32, change "c an" to -- can --
Line 57, change "impute" to -- impurity --

UNITED STATES PATENT AND TRADEMARK OFFICE
CERTIFICATE OF CORRECTION

PATENT NO. : 6,391,197 B1
DATED : May 21, 2002
INVENTOR(S) : Colin Billiet

It is certified that error appears in the above-identified patent and that said Letters Patent is hereby corrected as shown below:

Column 6 (cont'd),
Line 59, change "g,as" to -- gas --
Line 59, after "stream" insert -- , --

Column 7,
Line 2, after "materials" insert -- , --
Line 14, after "housing" insert -- , --
Lines 20 and 22, change "te" to -- the --
Line 21, before "support" delete "."
Line 24, change "he" to -- the --
Line 50, change "rest" to -- rests --
Line 57, change "e" to -- the --

Column 8,
Line 1, change "at" to -- an --

Column 10,
Line 20, change "gag" to -- gas --
Line 26, after "extending" change "longitudinal" to -- longitudinally --

Signed and Sealed this

Seventh Day of September, 2004

JON W. DUDAS
*Director of the United States Patent and Trademark Office*